US008511453B2

(12) United States Patent
Spandern et al.

(10) Patent No.: US 8,511,453 B2
(45) Date of Patent: Aug. 20, 2013

(54) FRICTION LINING FOR A FRICTION CLUTCH

(75) Inventors: Christian Spandern, Elkenroth (DE); Tim-Florian Gerbing, Betzdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 385 days.

(21) Appl. No.: 12/936,414

(22) PCT Filed: Mar. 26, 2009

(86) PCT No.: PCT/DE2009/000422
§ 371 (c)(1),
(2), (4) Date: Oct. 5, 2010

(87) PCT Pub. No.: WO2009/124525
PCT Pub. Date: Oct. 15, 2009

(65) Prior Publication Data
US 2011/0024257 A1    Feb. 3, 2011

(30) Foreign Application Priority Data

Apr. 7, 2008  (DE) .......................... 10 2008 017 560

(51) Int. Cl.
*F16D 69/02*    (2006.01)
(52) U.S. Cl.
USPC ...................................... 192/107 M; 156/169

(58) Field of Classification Search
USPC ...................................................... 192/107 M
See application file for complete search history.

(56) References Cited

U.S. PATENT DOCUMENTS

| 4,118,528 | A | * | 10/1978 | Lowry .......................... 428/66.2 |
| 4,244,994 | A | * | 1/1981 | Trainor et al. .................. 428/37 |
| 4,418,115 | A | * | 11/1983 | Le Lannou .................... 442/101 |
| 4,539,240 | A |   | 9/1985 | Wargin |
| 5,217,778 | A | * | 6/1993 | LaCasse ...................... 428/66.2 |

FOREIGN PATENT DOCUMENTS

| DE | 33 38 365 Y | 4/1984 |
| DE | 44 20 291 Y | 5/1995 |
| EP | 0 063 453 Y | 10/1982 |
| WO | 2007/121704 Y | 11/2007 |
| WO | 2008/119323 | 10/2008 |

* cited by examiner

*Primary Examiner* — Richard M. Lorence
(74) *Attorney, Agent, or Firm* — Lucas & Mercanti, LLP

(57) ABSTRACT

A friction lining for a clutch disk for a frictional clutch which is manufactured from a preform article wound from strand material and subjected to a hot pressing process. Glass fibers of the friction lining are at least partially replaced by mineral fibers for minimizing abrasive behavior. The short glass fibers and other components such as aramide fibers, polyacryl nitrile fibers as well as artificial mineral fibers are processed into a non-woven fabric in a carding step and strips of the fabric, with the inclusion of at least one metal wire, are twisted to form the strand material. The strand material manufactured in this manner is impregnated with binding agent and filling agents and is processed into a preform.

10 Claims, No Drawings

FRICTION LINING FOR A FRICTION CLUTCH

This application is a 371 of PCT/DE2009/000422 filed Mar. 26, 2009, which in turn claims the priority of DE 10 2008 017 560.9 filed Apr. 7, 2008, the priority of both applications is hereby claimed and both applications are incorporated by reference herein.

The invention relates to a friction lining and a method of manufacturing a friction lining for clutch disks of a frictional clutch.

Friction linings of this type are used for clutch disks of frictional clutches in automobiles, wherein, depending on the manner of operation of the frictional clutch, a frictional engagement between frictional surfaces of metal of the frictional clutch and the friction linings can adhere or slip, and transmit a corresponding torque from a drive unit to a driven unit.

Because of the high rates of rotation of the frictional clutch, the friction lining should have a high bursting rate of rotation. For securing a long-term operation, the friction lining is to be low wear and still have good friction values.

For increasing the bursting strength of the friction lining, it is already known to place strand material of friction-resistant materials, for example, yarn, which has been impregnated with a binding agent, in several wave-shaped flat layers in the circumferential direction, wherein, for example, the windings of the strand material are guided elliptically or sinusoidally from outer diameter to outer diameter so as to form reversing areas and keeping the inner diameter free, wherein the reversing areas are from one winding to the next angularly offset over the circumference. This makes it possible to increase the proportion of the strand material in the total composition of the friction lining and, thus, to increase its frictional and bursting strength. Winding takes place usually with the aid of a winding machine wherein by definition one layer is wound per revolution in the circumferential direction. The number of the reversing areas over a circumference of the friction lining is called the winding ratio. The winding ratio of 1:10, for example, describes that the strand material has 10 reversing areas over one circumference. Preforms wound in this manner are pressed into their final shape in a hot pressing process. In order to obtain a stable and dimensionally unchanging friction lining, the friction lining is constructed in an empirically determined thickness which, in addition to the friction layer whose thickness decreases during operation as a result of wear, may contain a support layer which contains particularly a different winding, which is conducive to the load bearing capacity.

For optimizing the bursting strengths of the friction lining, glass fibers are used in the strand material which, particularly after a solidification with the binding agent, impart a mechanical strength to the friction lining, depending on the proportion. However, it has been found that especially at low temperatures the abrasive wear of the frictional surfaces of the frictional clutch caused by the glass fibers subjects the surfaces of the counter-friction surfaces of metal of the frictional clutch, as well as the lining itself, to significant wear.

It is therefore the object to propose a friction lining which has a reduced abrasion behavior while still having a good strength.

The object is met by a friction lining for a clutch disk of a frictional clutch composed of a preform wound from strand material and provided with binding agent in a hot pressing process under pressure formed into a friction lining, wherein the preform is formed of a strand material having at least the following components:

a) up to 60% by weight glass fibers;
b) 1 to 40% by weight polyacryl nitrile fibers;
c) 1 to 25% by weight para-aramid fibers;
d) up to 80% by weight artificial mineral fibers;
e) 1 to 40% by weight copper or copper alloy.

By way of a thorough mixing of the individual fiber components, a homogeneous fiber mixture can be obtained which counteracts a concentration of glass fibers. In this connection, the strand material is advantageously manufactured from a non-woven fabric made by carding the fiber components and with a metal component twisted together with the non-woven fabric, for example, copper or its alloys, which are used in this case advantageously as endless wire material. The non-woven fabric made by means of the carding step can be cut into strips which are suitable for twisting together with the wire material, or they can be manufactured already with the appropriate strip width. It has been found to be advantageous if the length of the fiber components is similar and, for example, for glass fibers is between 30 to 70 millimeters, the polyacryl nitrile fibers are between 40 to 80 millimeters, and the para-aramid fibers are between 40 to 80 millimeters.

An alternative or additional possibility for improving the abrasion properties provides for the partial or complete replacement of glass fibers with an artificially manufactured mineral fiber. The substitution provides particularly for limiting the sum of glass fibers and artificial mineral fibers to be less than or equal to 80% by weight.

The length of the artificial mineral fibers may be less than that of the remaining fiber components, for example, 0.1 and 10 millimeters. The diameter of these mineral fibers is 6 to 15 micrometers.

The mineral fibers may be mixtures of naturally occurring minerals, for example, of volcanic origin and/or artificially manufactured, for example, of aluminosilicates, or minerals derived therefrom, which are transferred, finely pulverized, into the melt and are subjected to a spinning process, wherein the fiber length can be adjusted by means of the pressure and duration of the spinning process. The fibers have a high biological solubility and, thus, are safe with respect to health. An advantageous embodiment of an artificial mineral fiber material contains, for example:

35 to 45% by weight $SiO_2$,
20 to 25% by weight $Al_2O_3$,
20 to 25% by weight MgO and CaO,
3 to 6% by weight $K_2O$ and $Na_2O$,
3 to 6% by weight FeO.

In order to achieve good wetting with the binding agent, the artificial mineral fibers may be treated with a wetting agent; this may be chemicals which mediate between the inorganic properties of the artificial mineral fibers and the largely organic properties of the binding agent. This function can be fulfilled in a special manner by amino silane.

It has further been found that a limitation of the hardness according to Mohs of the fibers to smaller than or equal to 6.0 provides special advantages with respect to the wear of metal counter friction surfaces. The hardness of the artificial mineral fibers is therefore preferably limited to a limit value of 6.0 according to Mohs.

The object is further met by a process which provides for a manufacturing process on the basis of the above-described materials and the properties thereof, wherein a mixture of at least the following components with the predetermined proportions by weight, for example, of polyacryl nitrile fibers, para-aramid fibers as well as artificial mineral fibers and/or glass fibers. The proportion of mineral and glass fibers is selected according to the application. The mixture is preferably made by an intensive mixing in a closed container in the dry state. In particular applications, the fibers may be moistened with an aqueous or non-aqueous solution or a mixing solution with the addition of solubilizers like detergents, or may be mixed in an aqueous solution.

Subsequently, and, if applicable, after drying, the mixture is carded in a carding machine which is known per se, so that a non-woven fabric with uniformly distributed fiber components is obtained which, depending on the width, is twisted together with the addition of one or more wires of metal, such as copper or brass, or other alloys to form a strand or strand material.

At this point, the strand material may be moistened for better layout in order to form a preform or be treated with binding agent. In the same manner, the already wound preform may be impregnated for the first time or additionally with binding agent.

The winding of an annular preform takes place by means of a sinus-shaped movement whose points of return are positioned on the outer diameter and are displaced during the winding process in the circumferential direction. The winding process is comparable to the line guidance of a drawing instrument for illustrating epicyclic figures known as Spirograph.

The preform is treated with binding agent in a liquid phase. The strand material optimized with respect to friction value and wear is brought to a constant ratio of binding agent and strand material and is dried. Dispersions, for example of polymer components, fillers and the like in solvents have proven advantageous as the liquid phase of the binding agent. The polymer components, which are subjected in a hot pressing process to a further cross-linking or polymerization, for example, by condensation, addition or substitution reactions, may be composed of thermosetting components such as phenol resin or melamine resin, as well as elastomer components, such as, for example, SBR or NBR rubber. Fillers are, for example, barium sulfate, kaolin or soot. Used as solvent is usually water. The dried strand material is subsequently wound into a preform.

In the following method step, the preform is subjected in a mold for the dimensionally correct manufacture of the friction lining to a hot pressing process, for example, at a pressure of 30 N/mm$^2$ and temperatures of about 150. For increasing the bursting strength and/or for a better reception on the clutch disk, the preform may be compressed with a carrier sheet metal and/or riveted or glued onto a carrier sheet metal. Two friction linings may be provided on a clutch with the friction surfaces facing away from each other and with the intermediate arrangement of an axially effective lining spring.

The invention claimed is:

1. A friction lining for a clutch disk of a frictional clutch, comprising:
   a preform wound from strand material and provided with a binding agent, formed in a hot pressing process under pressure, the strand material having components including polyacryl nitril fibers, para-aramid fibers, copper or copper alloy, and at least one of artificial mineral fibers and a mixture of glass fibers and artificial mineral fibers, the artificial mineral fibers inclilding artificially manufactured minerals, the components of the strand material being contained in the following amounts:
   a) up to 60% by weight glass fibers,
   b) 1 to 40% by weight polyacryl nitrile fibers,
   c) 1 to 25% by weight para-aramid fibers,
   d) up to 80% by weight artificial mineral fibers, and
   e) 1 to 40% by weight copper or copper alloy.

2. The friction lining according to claim 1, wherein a length of the glass fibers is between 30 and 70 millimeters, a length of the polyacryi nitrite fibers is between 40 to 80 millimeters, and a length of the para-aramid fibers is between 40 to 80 millimeters.

3. The friction lining according to claim 1, wherein a sum of the glass fibers and the artificial mineral fibers is less than or equal to 80% by weight.

4. The friction lining according to claim 1, wherein the artificial mineral fibers have a length of between 0.1 and 10 millimeters and a diameter of between 6 and 15 micrometers.

5. The friction lining according to claim 1, wherein the artificial mineral fibers have at least the following components:
   35 to 45% by weight $S_iO_2$,
   20 to 25% by weight $Al_2O_3$,
   20 to 25% by weight MgO and CaO,
   3 to 6% by weight $K_2O$ and $Na_2O$, and
   3 to 6% by weight FeO.

6. The friction lining according to claim 1, wherein the artificial mineral fiber is treated with a wetting agent.

7. The friction lining according to claim 6, wherein the wetting agent is amino silane.

8. The friction lining according to claim 1, wherein the artificial mineral fibers have a hardness according to Mohs of less than or equal to 6.0.

9. A method of manufacturing a friction lining according to claim 1, the method comprising:
   a) manufacturing a mixture of at least the following components with predetermined portions by weight:
      polyacryl nitrile fibers,
      para-aramid fibers, and
      artificial mineral fibers to which glass fibers may be mixed while maintaining the portion by weight,
   b) carding the mixture for manufacturing a non-woven fabric,
   c) cutting the fabric into strips,
   d) twisting the strips using at least one wire of copper or copper alloys into a strand,
   e) winding in an annular preform by means of a sinus-shaped movement whose points of return are positioned on an outer diameter and are displaced during the winding process in a circumferential direction,
   f) wetting the preform article with a binding agent, and
   g) dimensionally correct pressing the preform article in a hot pressing process.

10. The method according to claim 9, wherein the artificial mineral fibers are obtained from a melt by a spinning nozzle method.

* * * * *